No. 608,655. Patented Aug. 9, 1898.
R. DOUGLAS.
FILTERING APPARATUS.
(Application filed Aug. 24, 1897.)
(No Model.)
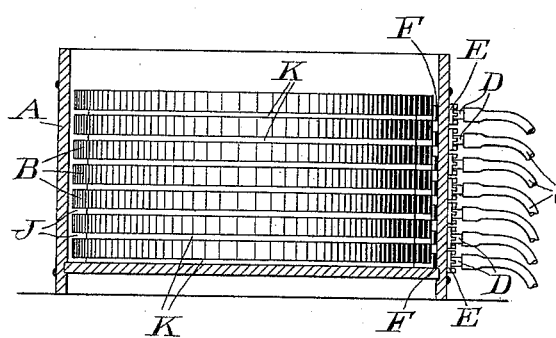
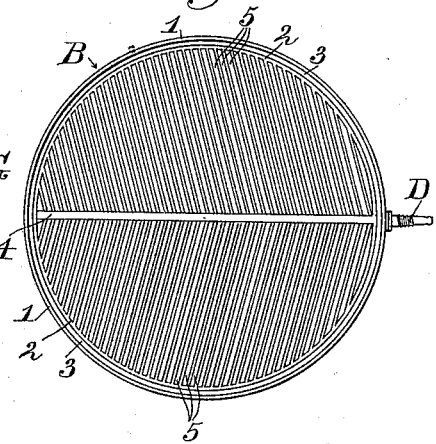
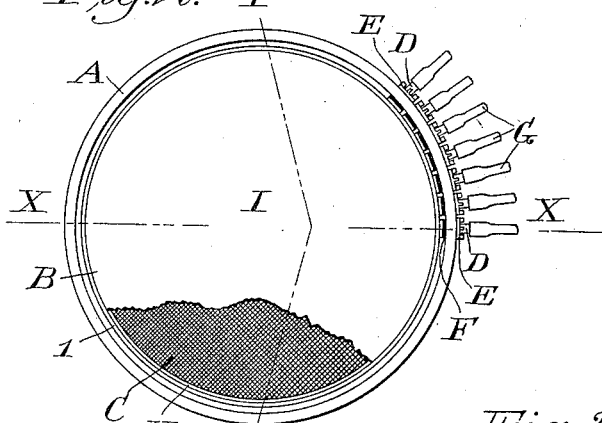
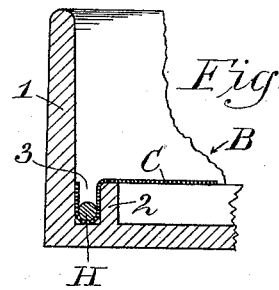
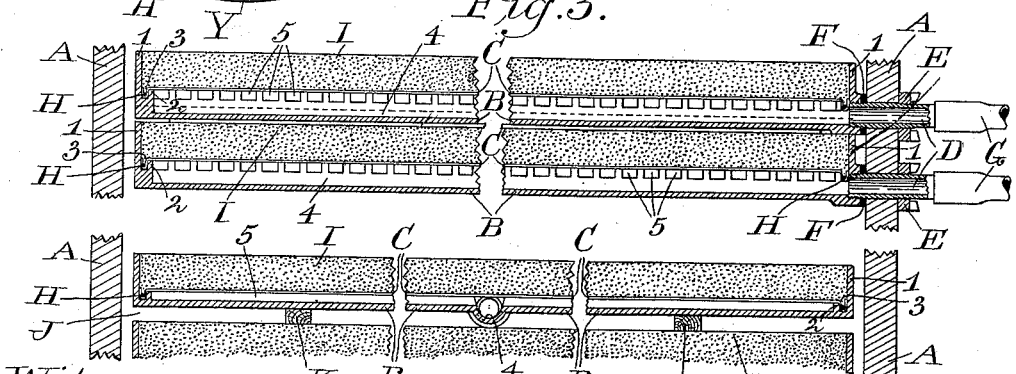
Witnesses:
J. W. Fisher.
E. Luddeke.
Inventor:
Robert Douglas.
by William H. Low,
Attorney.
THE NORRIS PETERS CO., PHOTO-LITHO., WASHINGTON, D. C.

UNITED STATES PATENT OFFICE.

ROBERT DOUGLAS, OF RAVENA, NEW YORK.

FILTERING APPARATUS.

SPECIFICATION forming part of Letters Patent No. 608,655, dated August 9, 1898.

Application filed August 24, 1897. Serial No. 649,293. (No model.)

*To all whom it may concern:*

Be it known that I, ROBERT DOUGLAS, a subject of the Queen of Great Britain, residing at Ravena, in the county of Albany and State of New York, have invented new and useful Improvements in Filtering Apparatus, of which the following is a specification.

My invention relates to improvements in the class of filtering apparatus which is specially adapted to clarifying cider, wine, and other liquids and in which the process of clarification is effected while the liquid is passing through the apparatus by a force due to the gravity of the liquid and not by reason of any extraneous pressure applied to the liquid; and the object of my invention is to provide facilities for effecting the clarification of liquids in a perfect and rapid manner by means of a simple, efficient, and reliable apparatus. This object I attain by the means herein described, shown in the drawings, and specifically pointed out in the claims, which form part of this specification.

My improvement consists of an apparatus composed of a series of superimposed filtering-pans, each containing an independent filtering-bed and having its own outlet, the upper face of the bottom plate of each of said filtering-pans being provided with a series of lateral grooves that lead into a diametrically-arranged gutter that communicates with an independent discharge-outlet, and each of said filtering-pans being provided with a cloth or other material for supporting a bed of filtering material, the latter having sufficient porosity to allow the liquid to pass through it without clogging the apparatus.

In the accompanying drawings, which are herein referred to and form part of this specification, Figure 1 is a vertical section of the casing or receptacle which constitutes the liquid-containing receiver which incloses the filtering-pans, the latter being shown in elevation in said figure; Fig. 2, a plan view of Fig. 1, with part of the filtering-bed of the uppermost filtering-pan broken away to show underlying parts; Fig. 3, an enlarged vertical section of Fig. 2 at the line X X; Fig. 4, an enlarged vertical section of Fig. 2 at the line Y Y; Fig. 5, a detached plan view of a filtering-pan before the supporting-cloth and filtering-bed are attached thereto; and Fig. 6, an enlarged vertical section of a filtering-pan, showing a preferred manner of securing the supporting-cloth for the filtering-bed.

As represented in the drawings, A designates a preferred form of casing or receptacle for the liquid to be filtered and for containing the filtering-pans. Said casing is preferably made in the form of a circular tub having an open top and provided with a series of holes through one of its sides, and preferably said holes are arranged on an inclined or spiral line, so that one hole shall not be directly over another, but all being adjacent to the others.

B is the filtering-pan, of which one or several may be used in my filtering apparatus, and which is preferably circular, with a circumferential rim or standing flange 1 at its outer edge, said rim corresponding to or approximately to the height of the top of the bed of filtering material. An inner rim 2 of less height than the rim 1 is formed concentrically to the latter, so as to form an annular groove 3 between the two rims. Said inner rim carries a cloth C or other suitable drainage material, which supports a bed I of filtering material, which is preferably composed of porous paper-pulp; but when preferred sand or other suitable material may be substituted for said pulp. A gutter or channel 4 is formed diametrically across the upper face of the bottom of each filtering-pan, and said gutter leads into the opening of a nipple D, which is secured to the rim 1 and is arranged to extend through one of the holes hereinbefore referred to that are formed in the casing A, and a nut E is fitted to screw onto each nipple D, so as to draw the filtering-pan B snugly to its proper position. A gasket or ring F of compressible material interposed between the outer side of the rim 1 and the inner side of the casing A around each of said nipples forms a water-tight joint at those points.

The upper face of the bottom of each filtering-pan B is provided with a series of lateral grooves 5, which form direct communications with the gutter 4, so that liquid passing through said grooves will drain into the gutter 4 and thence through the nipple D, to which a flexible tube G or other suitable pipe may be attached, whereby the liquid will be conveyed into a proper receptacle for immediate or prospective use, as occasion may require. The grooves 5 are preferably arranged diagonally at opposite sides of the gutter 4 and so that the line of inclination of said grooves will form an obtuse angle to the line of said gutter. By means of the nut E each of the filtering-pans B is rendered removable from the casing A, thereby affording facilities for cleansing or replenishing the filtering material in each of said pans as occasion may require.

In preparing the filtering-pans B for use the cloth C or other material for supporting the bed of filtering material and having the form of a disk of suitable diameter is laid over the upper face of the bottom of the filtering-pan, so as to cover over the gutter 4 and grooves 5 and so that its edge will extend over and cover the annular groove 3. A cord H of suitable size and length is then pressed down to force the cloth down into the groove 3, thereby clamping said cloth in the groove 3 and securing said cloth in place and stretching the cloth tightly over the gutter 4 and grooves 5. After the latter has been accomplished a bed I of filtering material should be filled into said pan to an even depth, and if said filtering material is to consist of paper-pulp it should be composed of pulp formed from blotting-paper or other suitable bibulous material. In order to form spaces or openings J between the several filtering-pans, so as to allow the liquid to flow freely over the beds of filtering material, spacing-strips K or other suitable means should be arranged to bear upon the upper face of a filtering-pan and against the lower face of the pan next above.

The operation of my filtering apparatus is as follows: The casing is first filled with the liquid to be filtered to a height that will nearly reach to the top of said casing, and after said first filling a supply of said liquid should be fed into said casing to constantly maintain its level at the same height. The liquid will flow over the several filtering-beds and will percolate through the latter, thence through the grooves 5 and gutter 4, out of the nipple D, that is appropriated to the corresponding filtering-pan, and from thence it is conveyed through the flexible tubes G or other suitable means into a receptacle provided to receive said liquid, and the latter in passing through the filtering-beds will be deprived of any impurities that may be held in suspension therein.

What I claim as my invention, and am desirous of securing by Letters Patent, is—

1. A filtering apparatus, consisting of a containing-casing and a series of filtering-pans arranged—one on top of another—to leave a space between adjacent pans that will afford a free flow of liquid into each of said pans; each of the latter being provided with a filtering-bed supported by a cloth, netting, or foraminated material, and each having an independent outlet through which the filtered liquid will be discharged, as herein specified.

2. A filtering-pan provided with a series of drainage-grooves arranged at oppositely-inclined angles in respect to a diametrical line and leading into a diametrically-arranged gutter or channel which communicates with an independent outlet for the discharge of the filtered liquid at one side of said pan, as herein specified.

3. The combination, with a casing, A, or other receptacle for unfiltered liquid, of a series of filtering-pans, B, superimposed one upon another, and each provided with an independent discharge-pipe, D', leading through the side of said casing, and means—substantially as set forth—for forming water-tight joints for said discharge-pipes with said casing, as herein specified.

4. In a filtering apparatus, the combination, with a filtering-pan, B, provided with a diametrically-arranged gutter, 4, a series of lateral grooves, 5, openly communicating with said gutter, and an annular groove, 3, which surrounds said gutter and grooves, of a supporting-cloth, C, or other material that will permit percolation, arranged to cover said gutter and grooves, and means—substantially as set forth—for securing said cloth to said pan, as herein specified.

5. In a filtering apparatus, the combination of an open-top casing, A, and a series of removable filtering-pans, B, contained in said casing and means—substantially as set forth—for securing said filtering-pans to one side of the casing; said filtering apparatus being adapted to operate by the force of gravity alone, as herein specified.

ROBERT DOUGLAS.

Witnesses:
WM. H. LOW,
J. W. FISHER.